United States Patent

[11] 3,599,232

| [72] | Inventor | Paul C. Tabor |
| | | Roseville, Mich. |
| [21] | Appl No | 819,576 |
| [22] | Filed | Apr. 28, 1969 |
| [45] | Patented | Aug. 10, 1971 |
| [73] | Assignee | Freedman Seating Co. |
| | | Evanston, Ill. |

[54] VEHICLE SEAT SUSPENSION SYSTEM
15 Claims, 8 Drawing Figs.

[52] U.S. Cl.......... 248/399,
248/400
[51] Int. Cl............ B60n 1/02
[50] Field of Search ........... 248/399,
400, 401, 421, 373; 297/304

[56] References Cited
UNITED STATES PATENTS

| 2,334,922 | 11/1943 | Gustafson | 248/399 |
| 2,840,140 | 6/1958 | Harrington | 248/400 |
| 2,936,818 | 5/1960 | Harrington et al. | 248/399 |
| 2,949,153 | 8/1960 | Hickman | 248/399 |
| 3,150,855 | 9/1964 | Carter et al. | 248/400 |
| 3,237,906 | 3/1966 | Hegl | 248/399 |
| 3,319,920 | 5/1967 | Freedman et al. | 248/399 |
| 3,325,136 | 6/1967 | Radke et al. | 248/400 |
| 3,335,996 | 8/1967 | Hall et al. | 248/400 |

Primary Examiner—Marion Parsons, Jr.
Attorney—Alter, Weiss and Whitesel

ABSTRACT: Improved suspended vehicle seat having a suspension system comprising means to enable a vehicle operator to adjust the riding height of the seat and to maintain the seat suspension rate while driving. In one embodiment, the suspension rate is adjusted by varying the angle of a seat suspension spring by means of a positionable rail-riding bracket having one end of the spring associated therewith. The height adjustment of the spring is made by selectively preloading the compression of the suspension spring.

INVENTOR
PAUL C. TABOR

BY Alter and Weiss
ATTORNEYS

VEHICLE SEAT SUSPENSION SYSTEM

This invention relates to improved vehicle seats, and more particularly, to suspension systems for use in conjunction with vehicle seats such as the seats used in trucks, busses or other automotive vehicles.

The seats used in vehicles, such as trucks and busses, for example, include suspension systems that support the seat structure, for movement thereon so as to absorb some of the vibrations and shocks generated in the moving vehicle when it is traveling over the road, thereby providing a safer and more comfortable ride to the vehicle operator.

Prior art suspension systems, such as that shown in U.S. Pat. No. 3,319,920 which issued on May 16, 1967, have included seat height adjustments and suspension rate adjustments, i.e. the adjustment of the amount of seat deflection for a given load. However, these prior art systems have not proved ideal, among other ways, in that the height adjustment affected the rate adjustment and in addition, in many of the prior art systems, the adjustments particularly the rate adjustment, could not be made while the driver was sitting on the seat, or even while the suspension system resilient means was preloaded. More commonly, the vehicle had to be stopped, the driver had to get out and make the rate adjustment. It is preferential that the suspension rate adjustment can be made while the driver is occupying the cab and even while driving. Thus, the driver may want to change the rate when he transfers from an asphalt covered road to a gravel road, for example.

Accordingly, it is an object of this invention to provide a vehicle seat suspension system for absorbing the light shocks and vibrations encountered by the moving vehicle.

It is a related object of the present invention to provide a seat suspension arrangement which resiliently mounts a seat through a spring arrangement wherein the suspension rate of the seat can be readily adjusted through an infinite range of rates between certain limits.

A still further object of this invention is to provide a vehicle seat suspension system wherein the driver can vary the height of the seat while driving without having to change the preloading of the spring and where the driver can maintain a desired suspension rate of the seat without having to change the riding height of the seat.

Yet, another object of the invention is to provide a seat suspension arrangement using as many duplicate parts as possible, and with as simple an arrangement as possible.

A preferred embodiment of the invention comprises a seating arrangement wherein a lower staunchion is provided as a base unit and an upper staunchion is provided as seat- supporting unit. A linkage and suspension rate assembly comprising linkage arms which are arranged in a parallelepiped couple the upper and the lower staunchions. A compression spring is pivotally attached to a lower pair of linkage arms and supports the upper staunchion where it is attached to a variable point thereon. The bottom of the compression spring is capable of being moved along the lower pair of linkage arms.

The seat is attached to the upper staunchion. The upper staunchion is moved up or down for eye level adjustment by moving the variable attachment point of the compression spring between its topmost position and its lowermost position. This, in effect, changes the preloading of the compression spring to enable a change in the riding height of the seat without effecting the no load height of the seat, that is the seat height when not occupied by the driver.

The suspension rate is adjusted by the movement of the bottom end of the spring along the linkage arms. This changes the angle of the axis of the spring relative to the vertical force vector. Thus, the seat-riding height and the suspension rate are separately controlled and the means for controlling each are available to the driver sitting in the seat. There is no necessity for changing the riding height when changing the suspension rate, except when very large rate changes are made.

The above-mentioned and other features and objects of this invention and the manner of attaining them will become more apparent and the invention itself will be best understood by reference to the following description of an embodiment of the invention taken in conjunction with the accompanying drawings, wherein:

FIG. 7 is a fragmentary sectional view taken along line 7–7 in FIG. 1; and

FIG. 8 is a fragmentary sectional view taken along line 8–8, in FIG. 6.

Figure 1:
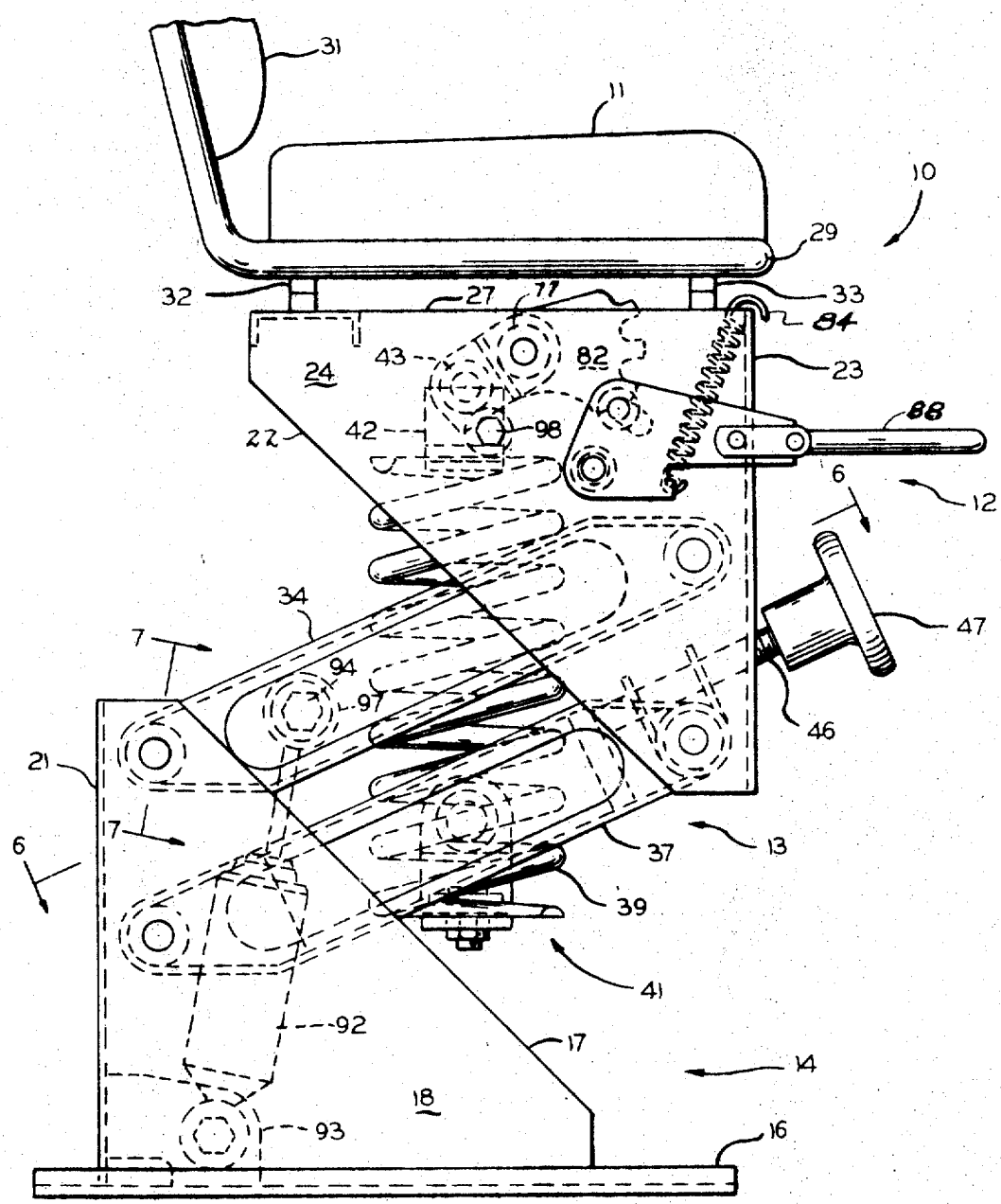
FIG. 1 shows a side elevational view of the improved vehicle seat suspension system in accordance with the invention.

Similar characters of reference indicate corresponding parts an features throughout the various views, and referring now to the same, the character 10 is used to designate the improved vehicle seat suspension system generally. The assembly 10 is comprised of a seat portion 11, the seat-supporting unit of the suspension system 12, the linkage and suspension rate adjust system 13, and the base unit 14.

The base unit 14 is comprised of a bottom plate 16 which is designed for attachment to the floor of the vehicle. The means of attachment are not shown but any well known means can be used. The base unit 14 provides means for supporting the entire suspension system. More particularly, lower staunchion 17 is provided. The lower staunchion 17 comprises a first sidewall 18, a second sidewall 19, and a backwall 21. Similarly, the seat supporting unit 12 comprises an upper staunchion 22 that is made up of a front wall 23, a first sidewall 24 and a second sidewall 26.

Figure 2:
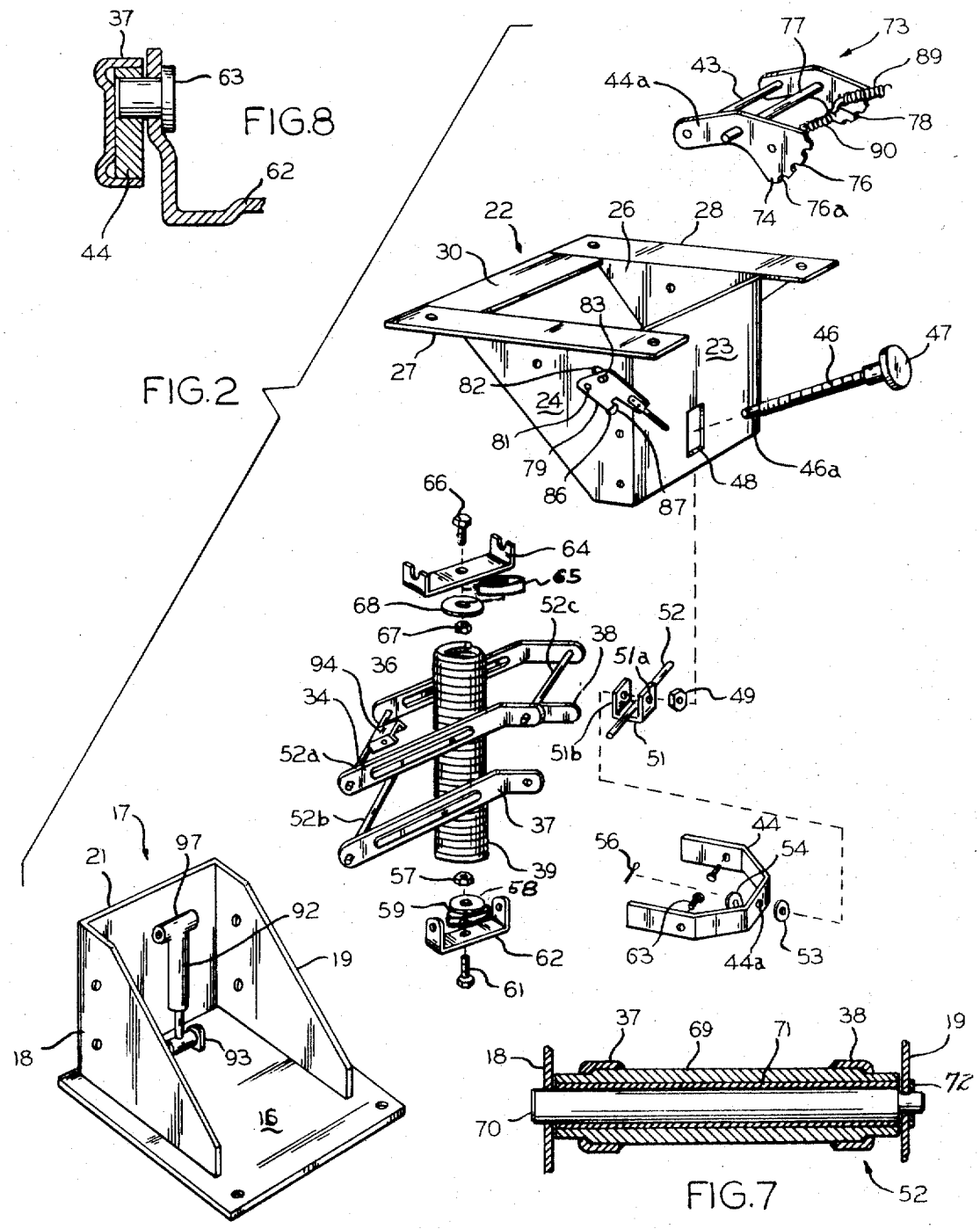
FIG. 2 is an exploded view of key portions of the embodiment of the suspension system shown in FIG. 1.

Means are provided for attaching the seat 11 to the upper staunchion 22. More particularly, as shown in FIG. 2, permanently affixed to the upper staunchion 22 are horizontally disposed side plates 27 and 28. The sideplates are shown particularly, in FIG. 2, as having holes therein for receiving fasteners, such as bolts. The bolts pass through the holes and are attached to the frame 29 of seat 11, for example. A horizontally disposed plate 30 may be provided joining the tops of the sidewalls 24, 26 at the rear ends thereof. A portion of the backrest of the seat 31 is shown in FIG. 1. FIG. 1 also shows spacers 32, 33 between the frame 29, and the sideplates.

The upper staunchion 22 of the seat supporting unit 12 is coupled to the base unit 14 through the linkage and suspension rate adjust system 13. The linkage and suspension rate adjustment system 13 comprises an upper pair of coplanar, spaced apart linkage arms 34, 36; and a lower pair of coplanar, spaced apart linkage arms 37 and 38. The two pairs of linkage arms form the frame of a parallelepiped in combination with the lower and upper staunchions.

Resilient means are provided in the suspension system for absorbing the vibrations generated by the vehicle in motion to give the driver a more comfortable ride. Due to the resiliency of the means, a given force applied to the seat causes unit deflection of the seat. The ratio of this force to the unit deflection is known as the suspension rate.

In FIG. 1 the resilient means is a compression spring 39. The lower end of compression spring 39 is mounted into a spring keeper assembly 41. The upper end of spring 39 is shown attached to a spring plate assembly 42, which in turn is permanently attached to an eye level height adjust shaft 43.

The spring keeper assembly 41 is pivotally attached to a U-shaped track riding bracket or yoke 44. The U-shaped track riding bracket 44 provides means for moving the end of the spring 39 along the lower parallel linkage arms 37 and 38 to vary the rate of the suspension system. Thus, the linkage arms, provide the tracks for U-shaped track riding bracket or yoke 44.

Means such as position rod 46 are provided for controlling the movement of the U-shaped bracket 44 in the tracks provided by parallel linkage arms 37 and 38. The rod 46 is equipped with a knob 47 thereon.

Figure 6:
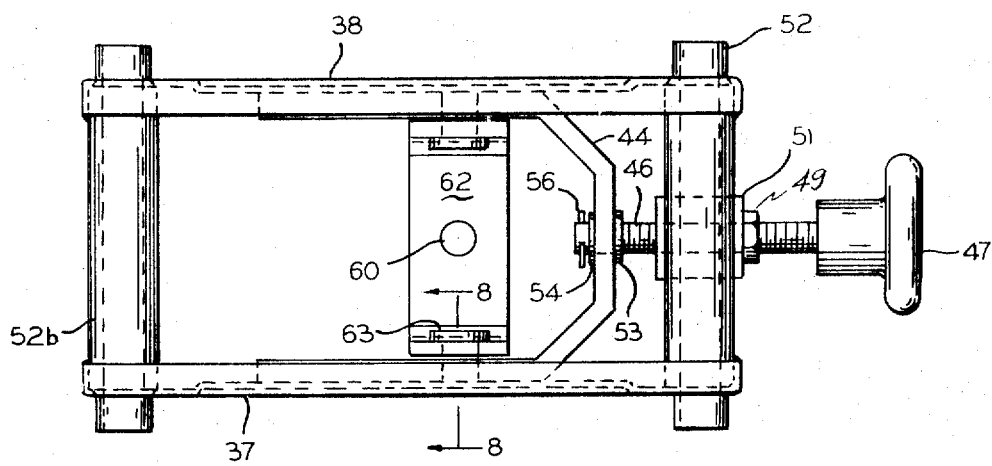
FIG. 6 is a fragmentary sectional view taken along line 6–6 in FIG. 1.

As best seen in FIGS. 2, 6 and 8, the rod 46 acts by extending through front wall aperture 48 in the upper staunchion 22, and threading through nut 49 which is held between a U-shaped pin bracket 51 and front wall 23. The rod extends through apertures 51a, 51b in pin bracket 51, over the top of the pivot pin through means such as washer 53, aperture 44a, in track riding bracket 44 and washer 54. The portion of the rod 46 that extends through bracket 44 need not be threaded. Means such as cotter pin 56 passes through a hole at the end of rod 46 to retain the rod in bracket 44. The nut 49 is captured between bracket 51 and wall 23. Thus, when the knob 47 is turned, the rod 46 is threaded through nut 49, and moves through the apertures in bracket 44. Since nut 49 is held in place between the front upper staunchion wall 23 and the pin bracket 51 and since yoke 44 is held to rod 46 between washers 53 and 54, the turning of knob 47 causes the yoke 44 to move in the tracks of linkage arms 37, 38 moving the end of the spring 39. The end of the spring pivots where the spring keeper assembly 41 and the yoke 44 are joined.

It should be understood that it is within the scope of the invention to use other arrangements to move track-riding bracket 44.

As best seen in FIGS. 2, 6 and 8, the spring keeper assembly 41 comprises a nut 57, a washer 58, a spring keeper plate 59 and a bolt 61. The keeper plate 59 is fitted onto and fixedly attached to the end of the spring 39 to hold the end of the spring to spring bracket 62. The spring bracket in turn is pivotally attached to yoke 44 with pivot pins, such as pivot pin 63, held in place by well-known means. Thus, the bottom end of the spring 39 is free to move along the tracks formed by lower linkage arms 37, 38 to change the angular attitude of spring 39 because the spring keeper assembly pivots in yoke 44, as the yoke 44 is moved in the tracks of the lower linkage arms 37 and 38. Changing the attitude of spring 39 changes the suspension rate since the force vectors applicable to the springs change. Thus, the suspension rate can be changed continuously within the limits provided by the operational length of threaded rod 46.

The upper spring plate assembly 42 comprises an upper spring bracket 64 which is held to the spring with upper spring plate 65, that is fixedly attached to the spring, in conjunction with fasteners, such as bolt 66 operating in cooperation with nut 67. A washer 68 is shown, disposed between the bracket 64 and nut 67.

The linkage and rate adjust assembly 13 is pivotally attached to the upper and lower staunchions using four pivot pin assemblies, such as pivot pin assembly 52 which is best shown in FIG. 7. As shown therein, the pivot pin assembly comprises a hollow outer shaft 69 surrounding a bearing pin 70 which extends through the walls of the staunchions. Bearing liner 71 is used as a further bearing means in conjunction with the outer shaft 69 and the bearing pin 70. Means are provided for holding the pin in place, for example, a push nut fastener 72 may be used.

Means are provided for adjusting the height of the seat above the floor to assure a comfortable and safe eye level for the vehicle operator. More particularly, in the embodiment shown in FIG. 2, an eye level adjustment assembly 73 is provided. Assembly 73 comprises a pair of spaced apart notched brackets, such as bracket 74 with notches 76 therein.

Eye level height adjust shaft 43 is pivotally attached between the spaced apart and notched brackets 74 at the back ends thereof. It is this shaft 43 which is fixedly attached to upper spring bracket 62. A pivot shaft 77 is fixed to the brackets 74 and extends therethrough. It is journaled in the sidewalls 24, 26 of staunchion 22 enabling the assembly 73 to pivot thereabout. A handlebar shaft 78 is fixedly attached to both brackets 74 at the front ends thereof. The pivot shaft 77 is mounted closest to the tops of the brackets 74. Shaft 78 is mounted close to the bottom of the brackets 74 and shaft 43 is mounted between shafts 77 and 78.

A pin bracket 79 is pivotally attached to the side plate 24 of the upper staunchion 22. The bracket 79 is attached so that it can pivot around pivot fastener 81. An arcuate pin aperture 82 is wall 24 enables pin 83 of pin bracket 79 to extend through the wall 24 to selectively, cooperatively mesh with notches 76 in bracket 74, to hold the bracket assembly 73 at a fixed position.

Means are provided for holding pin bracket 79 in a normal position. More particularly, the pin bracket spring 84 reaches from its attachment point on front wall 23 to a tang 86 on the pin bracket 82. The tang 86 extends through an arcuate tang aperture 87 in wall 24. Thus, the spring 84 holds the pin bracket 79 in a normally raised position so that the pin 83 will mesh with one of the notches 76.

Means such as handle 88 is provided for actuating the pin bracket against the restoring force of spring 84 to release the bracket assembly 73 for moving the pin from the meshed positioned in notches 76. Thus, to change the seat riding elevation, the handle 88 is operated.

Means are provided for preloading spring 39 even when the seat supporting unit 12 is in a normally raised unloaded position, that is, without the driver in the seat. More particularly, in FIG. 2, suspension springs, such as tension springs 89, 90 are shown for forcing bracket assembly 73 into a normally raised position. In the normally raised position shaft 43 pushes down on spring 39 to preload the spring 39.

Spring 39 is normally longer than the distance between its bottom end coupled to linkage arms 37, 38, and its top end joined to shaft 43 when shaft 43 is at any position lower than its zenith. Thus, spring 39 is normally preloaded. Means are provided for limiting the upward travel of seat support unit 12. More particularly, anchor means 92 is coupled between floor 16 and linkage arm 34, 36 to prevent said arms from rising above a given limit. Thus, preloaded spring 39 forces staunchion 22 to move upward by exerting a vertical lifting force through the ends of the linkage arms attached to staunchion 22. The linkage arms rotate about the pivot pin which attaches them to staunchion 17. The upward travel of the linkage arms is limited by anchor means 92. Thus, the seat is retained at a raised unloaded position. The riding height of the seat varies as the preloading on spring 39 changes. Thus, when the pin is in the lowermost notch of assembly 73, then the spring is at its maximum preloaded condition. In this condition, the deflection caused by the driver's weight is minimized, and the riding height is maximized. When the assembly 73 has the pin in the highest notch, the preload is minimum and the riding height is minimum.

Figure 3:
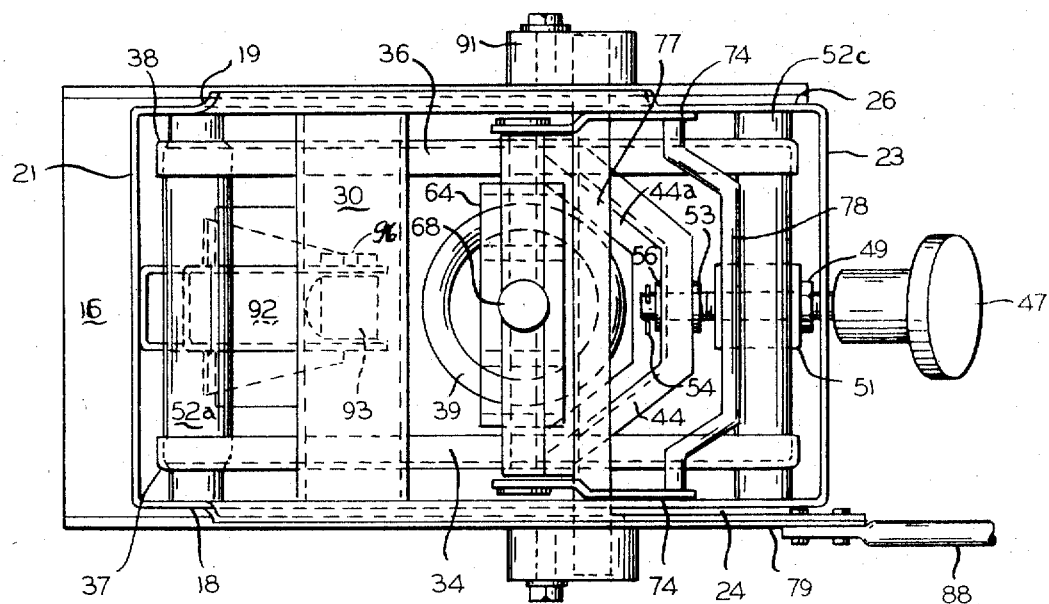
FIG. 3 is a plan view of the suspension system shown in FIG. 1 with the seat removed.

In FIG. 3, another embodiment of the means for maintaining the maximum preload on spring 39 and consequently, the riding height shows motor springs, such as spring 91, for maintaining the bracket assembly 73 in a desired position. Motor spring 91 operates in fashion well known to those skilled in the art for retaining a normal position for bracket assembly 73.

As shown in FIGS. 1 and 2, there are four notches, 76, in plate 74, and the bracket assembly thus can have five positions (one position with pin contiguous to the bottom of bracket 74). When the handle 88 is pushed down, the pin 83 is removed from the notches 76 and the front end of bracket assembly 73 moves upward responsive to spring forces applied by springs 89, 90 for example. If the handle is released when the bracket 79 is in a position so that the pin then fits in the lowest notch 76a, the riding height of the seat will be elevated. To lower the seat, the driver merely has to push down on handle 88, exert a force downward on the seat, and allow the handle to return to its normal position wherein the pin 83 will fit into one of the notches above notch 76a. When this occurs, shaft 43 exerts less of a downward force on compression spring 39 through upper spring plate assembly 42, and the spring 39 thus has a smaller preload thereon. Thus, the seat deflects a greater amount under the weight of the driver, so that the riding height is decreased.

Means are provided for damping the vibration of the suspension system. More particularly, the anchor 92 can be a shock absorber, such as well-known hydraulic shock absorber pivotally attached in any well-known manner, such as through bracket 93 to the bottom plate 16. The anchor or shock absorber 92 is also pivotally attached to the upper pair of link arms 34 and 36 through a shock absorber bracket 94 which is fixedly attached to pivot pin assembly 52a with fastener 96 journaled through the bracket and through yoke means 97 located at the top of shock absorber 92.

Means are provided for limiting the lowest position of the shaft 43. More particularly, a pin 98 is fixedly attached through sidewall 24 of the upper staunchion 22 and positioned so that the bottom of the notched eye level bracket 73 strikes the pin at the lowest desired position of shaft 43 and thereby prevents any further lowering thereof.

Figure 5:
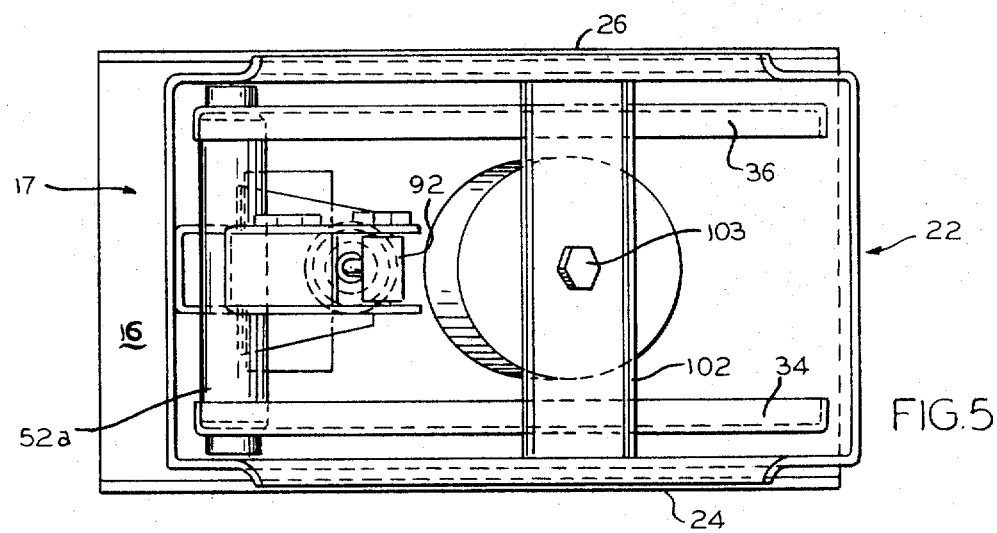
FIG. 5 is a top view of the suspension system of FIG. 4.
Figure 4:
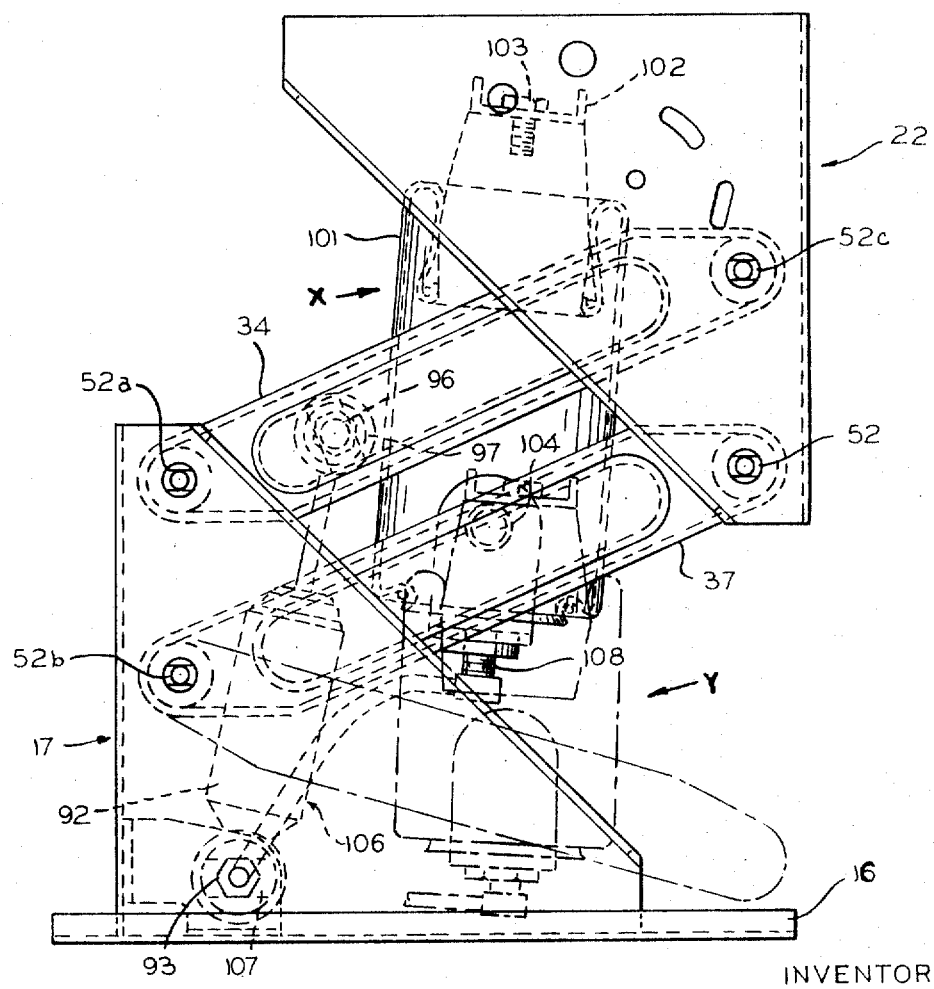
FIG. 4 is a side elevational view of another embodiment of the suspension portion of the improved vehicle seat suspension system.

FIGS. 4 and 5 show another embodiment of the invention wherein instead of the compression spring 39, an air bag or air spring assembly 101 is used to provide the required resiliency of the suspension system, and also to provide the height adjustments for the vehicle seat suspension system. In FIG. 4, the air spring is shown at X in its extended position, and it is partially shown at Y in its most compressed position. It should be understood that the rate suspension varying means are also applicable to this embodiment although they are not shown in FIGS. 4 and 5.

An air spring attaching bracket 102 extends between and is permanently attached to the walls 24 and 26 of the upper staunchion. The air spring is fixedly attached at its upper end to bracket 102 with means such as threaded fastener 103. The bottom end of the air spring assembly 102 is pivotally attached to lower link arms 37 and 38 with pivot bracket assembly 104.

To raise or lower the seat, the operator of the vehicle merely operates controls, now shown, which causes the entrance or exit of air into and out of the air spring through the air hose assembly 106. The entrance of the air into the air spring increases the length of the air spring and the exit of air from the air spring decreases its length. The air hose itself 105 is a flexible unit having a connection valve at 107 for connecting the air spring to the compressed air system of the vehicle. The hose 105 is connected to the air bag, or air spring assembly 101, at coupling 108.

The air spring is ideal for this operation since its rate does not change with changes in length; i.e. with changes in the amount of air in the air spring. Thus, if it is designed to give the ideal rate for the suspension system at one height it will maintain this rate for all heights.

Thus, the assembly of FIG. 4 and FIG. 5 comprises the upper staunchion 22 connected to the lower staunchion 17 through parallel arranged linkage arms 37, 38 and 34 and 36. The linkage arms pivot around pivot pin assemblies such as pivot pin assembly 51 in the same manner as the pivoting operation of the suspension system shown and described with regard to FIG. 1 and related Figures. A shock absorber 92 is provided for damping vibrations. Shock absorber 92 is pivotally coupled at 93 to base plate 16 at its lower end and pivotally coupled to the upper linkage assembly comprising the arms 34 and 36 using the bracket 94 attached to pivot pin assembly 52 in a manner similar to that shown in FIG. 1 and associated Figures.

The plates for mounting the seat assembly are not shown in FIGS. 4 and 5 but they are attached and may be similar to that shown for FIG. 1 and related Figures.

It should be noted that the staunchion units shown herein as the upper and lower staunchion units are similar in construction and interchangeable. Similarly, the linkage arms are also interchangeable as are the notched eye level brackets.

The embodiments provide means for readily adjusting the height of the seat while driving and as particularly shown in FIGS. 1, 2, 3, 6 and 8, (but applicable to FIGS. 4,5) also means for adjusting the rate of the suspension system while driving.

Further, the resilient means used in the suspension system in both cases acts to absorb fore and aft shocks, as well as vertical vibrations. This is accomplished through the shear resistance of the resilient means used.

In operation with the embodiment of FIG. 1, the driver sits on the seat 11 and readily adjusts the seat to the level he desires by pressing down on handle 88 of pin bracket. This removes the pin from its normal contiguous relation with the notches. If the driver transfers his weight slightly to his feet, the preload on the resilient means 39 is changed by the action of means, such as the motor torsion spring 91 or the coiled tension springs 89, 90 previously described. If he wants to lower the seat 11, he pushes down on the seat 11 slightly and when it is at the position he desires, he releases the handle 88 so that the pin 83 can fit into a notch 76 and maintain the seat at the riding height desired.

When he is driving along, if the suspension rate does not suit him, he can readily reach down, operate know 47 to move the bottom of the spring 39 until the rate is suitable.

In the embodiment of FIG. 4 and 5, the driver merely has to allow air to enter the air spring or else remove air from the air spring until the height of the seat is suitable. He can also vary the suspension rate by turning knob 47 to move the bottom of the air spring.

From the description above, it will become manifest to anyone familiar with the art that the device is simple in construction and positive in its function and performance, and although I have shown a specific construction and arrangement of the details, I am fully cognizant of the fact that many changes may be made in the material and the construction without effecting the operativeness of the device, and I reserve the right to make such changes as I may deem convenient or necessary without departing from the spirit of my invention or the scope of the appended claims.

Having thus described my invention, what I claim and desire to secure by Letters Patent in the United States is:

1. An improved vehicle seat suspension system for a vehicle seat having a suspension rate for minimizing shock and vibration effects on the driver of the vehicle,
    said system comprising a base unit,
    linkage means for coupling said seat-supporting unit to said base unit,
    resilient means in said system to provide the suspension rate,
    means for coupling one end of said resilient means to said linkage means,
    means for coupling the other end of said resilient means to said seat-supporting unit,
    means for pivotally attaching said linkage means to said base unit and to said seat-supporting unit, and
    height varying means for enabling the driver to vary the height of the supporting unit,
    said height-varying means comprising spring means attached between said seat-supporting unit and the means for coupling the other end of said resilient means to the seat-supporting unit,
    said spring means applying a force to said resilient means only while the height is being varied,
    whereby said height-varying means is operably while said driver is in the vehicle and enables the driver to vary the height of the support unit and to maintain the suspension rate while in said vehicle.

2. The system of claim 1 wherein said spring means comprises motor spring means.

3. The system of claim 1 wherein said means for coupling one end of said resilient means comprises attitude control means for pivotally attaching one end of said resilient means to the linkage means and to enable movement of the said one end to thereby control the suspension rate.

4. The improved vehicle seat suspension system of claim 3 wherein said means for enabling the driver to change the attitude control comprises means for sliding said resilient means along said parallel linkage means.

5. The improved vehicle suspension system of claim 4 wherein said base unit comprises a first staunchion having a first sidewall,
   a second sidewall spaced apart from said first sidewall,
   wherein said seat-supporting unit comprises a second staunchion having a first sidewall and a second sidewall spaced apart from said first sidewall, and
   wherein said parallel linkage means comprises a first and a second lower spaced apart parallel linkage arm,
   said first and second lower linkage arms being shaped to define guide rails,
   wherein said pivot means includes pin means for pivotally attaching said lower spaced apart first and second parallel linkage arms to the first and second sidewalls of said first and second staunchions whereby said linkage arms and said pin means define a parallelogram, and
   wherein said means for pivotally attaching said one end of said resilient means to said parallel linkage means comprising spring keeper means,
   a rail-riding bracket fitting into said guide rails on said lower linkage arms,
   means for pivotally attaching said spring keeper means to said rail-riding bracket, and
   resilient means end position control means extending to the front of said suspension system for moving said rail-riding bracket to move said one end of said resilient means.

6. The suspension system of claim 5 wherein said resilient means end position control means comprises a threaded rod attached to said rail-riding bracket, and
   fixed female threaded means located between the front of said suspension system and said rail-riding bracket,
   said threaded rod being threaded through said fixed female threaded means, whereby turning said thread rod moves said rail-riding bracket in said rails.

7. The suspension system of claim 6 wherein said resilient means comprises a coiled compression spring.

8. The suspension system of claim 7 wherein said height-varying means comprises means for varying the relative positions of the top of said seat-supporting unit and said other end of said compression spring thereby varying the preload on said compression spring.

9. An improved vehicle seat suspension system having a suspension rate for minimizing shock and vibratory effects on the driver of the vehicle comprising a base unit for supporting the system and for attaching said system to the floor of the vehicle,
   a seat-supporting unit for supporting the vehicle seat,
   parallel linkage means for coupling the seat-supporting unit to the base unit,
   pivot means for pivotally attaching said parallel linkage means respectively to the base unit and to the seat-supporting unit,
   air bag means providing a deflection per unit force,
   attitude control means for pivotally attaching one end of said air bag control means to the parallel linkage in any one of a continuously variable plurality of positions,
   means for coupling the other end of said resilient means to the seat-supporting unit,
   height-varying means for enabling the driver to vary the height of the seat-supporting unit while sitting in said seat, and
   means independent of the height-varying means for enabling the driver to change the attitude control to a different one of said plurality of positions and thereby vary the suspension rate without varying the height of the seat-supporting unit.

10. The suspension system of claim 9 wherein said means for varying the height of said seat-supporting unit comprises means for injecting air into and removing air from said air spring thereby controlling the length of said air spring.

11. An improved vehicle seat suspension system having a suspension rate for minimizing shock and vibratory effects on the driver of the vehicle comprising:
    a base unit for supporting the system and for attaching said system to the floor of the vehicle, said base unit comprising a first staunchion having a first sidewall, a second sidewall spaced apart from said firs sidewall,
    a seat-supporting unit for supporting the vehicle seat, said seat-supporting unit comprises a second staunchion having a first sidewall and a second sidewall spaced apart from said first sidewall,
    parallel linkage means coupling the seat-supporting unit to the base unit, said parallel linkage means comprises a first and a second lower spaced apart parallel linkage arm, said first and second lower linkage arms being shaped to define guide rails,
    pivot means for pivotally attaching said parallel linkage means respectively to the base unit and the seat-supporting unit, said pivot means includes pin means for pivotally attaching said lower spaced apart first and second parallel linkage arms to the first and second sidewalls of said first and second staunchions whereby said linkage arms and said pin means define a parallelogram,
    resilient means comprising a coiled compression spring providing a deflection per unit force,
    means for pivotally attaching one end of said resilient means to the parallel linkage means, said means for pivotally attaching said one end of said resilient means to said parallel linkage means comprising spring keeper means,
    a rail-riding bracket fitting into said guide rails,
    means for pivotally attaching said spring keeper means to said rail-riding bracket,
    resilient means end position control means extending to the front of said suspension system for moving said rail-riding bracket to move said one end of said resilient means,
    said resilient means end position control means comprising a threaded rod attached to said rail-riding bracket,
    fixed female threaded means located between the front of said suspension system and said rail-riding bracket, said threaded rod being threaded through said fixed female threaded means, whereby turning said thread rod moves said rail riding bracket in said rails,
    means for coupling the other end of said resilient means to the seat-supporting unit,
    means for enabling the driver to vary the height of the seat-supporting unit while sitting in said seat, seat means for varying the height of said seat-supporting unit comprises means for varying the relative positions of the top of said seat-supporting unit and said other end of said resilient means, thereby varying the preload on said resilient means,
    wherein said means for varying the height of said seat-supporting unit includes said means for coupling the other end of said resilient means to the supporting unit,
    said last named coupling means comprising eye level control assembly means,
    said eye level control assembly means comprising a pair of spaced apart oppositely disposed control plates,
    at least one of said plates having a plurality of notches therein,
    means for pivotally connecting said eye level control assembly means to the first and second walls of said second staunchion respectively,
    an eye level height adjust shaft pivotally attached to and extending between said oppositely disposed pair of control plates,
    means for fixedly attaching the said other end of said resilient means to said eye level height adjust shaft,
    pin plate means pivotally attached to said first wall of second staunchion,
    pin means extending from said pin plate,
    said pin plate having a locking position wherein said pin meshes with selected ones of said notches for locking said control plates into position thereby positioning said eye level height adjust shaft to exert a desired preload on said resilient means, handle means for moving said pin plate to an unlocked position to remove said pin from said notches to enable varying said preload and consequently said riding height position, height-maintaining means for maintaining said eye level control assembly means at a certain position when said pin plate is in said unlocked position, wherein said handle means extends to the front of said suspension system, means for enabling the driver to vary the suspension rate while sitting in said seat, and said means for varying the suspension rate comprises means for moving one of said ends of said resilient means to change the coaxial force vector acting on said resilient means.

12. The suspension system of claim 11 wherein said height maintaining means comprises motor spring means attached between said second staunchion and said eye level control assembly means.

13. The suspension system of claim 11 wherein said riding height maintaining means comprises tension spring means, and means for coupling said tension spring means between said eye level control assembly means and said upper staunchion.

14. The suspension system of claim 13 wherein said means for coupling said tension spring means comprises a front plate extending between the first and second walls of said second staunchion, handlebar means extending between said spaced apart control plates in front of said means for pivotally connecting said eye level control assembly means to said first and second walls of said upper staunchions, said tension spring means applying force when connected between said handlebar means and the top portion of said front wall for maintaining said eye level height adjust shaft in a normally lowered position to thereby maximize the preload on said resilient means.

15. An improved vehicle seat suspension system having a suspension rate for minimizing shock and vibratory effects on the driver of the vehicle comprising:

a base unit for supporting the system and for attaching said system to the floor of the vehicle, a seat-supporting unit for supporting the vehicle seat, parallel linkage means coupling the seat-supporting unit to the base unit, pivot means for pivotally attaching said parallel linkage means respectively to the base unit and the seat-supporting unit, resilient means providing a deflection per unit force, means for pivotally attaching one end of said resilient means to the parallel linkage means, means for coupling the other end of said resilient means to the seat-supporting unit, means for enabling the driver to vary the height of the seat-supporting unit while sitting in said seat, said means for varying the height of said seat-supporting unit includes said means for coupling said other end of said resilient means to the seat-supporting unit, said last-named coupling means comprising eye level control assembly means, said eye level control assembly means comprising a pair of spaced apart control plates, at least one of said control plates having a plurality of notches therein, said seat supporting unit comprising first and second spaced apart sidewalls, means for pivotally connecting said eye level control assembly means to the first and second walls, an eye level height adjust shaft pivotally attached to and extending between said oppositely disposed pair of control plates, means for fixedly attaching the said other end of said resilient means to said eye level height adjust shaft, pin plate means pivotally attached to said first wall, pin means extending from said pin plate, said pin plate having a locking position wherein said pin meshes with selected ones of said notches for locking said control plates into a fixed position thereby locking said seat-supporting unit into a desired riding height position, handle means for moving said pin plate to an unlocked position to remove said pin from said notches to enable varying said height position, preload maintaining means for maintaining said eye level control shaft means at a certain lowered position when said pin plate is in said unlocked position, wherein said handle means extends to the front of said suspension system, and means for enabling the driver to vary the suspension rate while sitting in said seat.